United States Patent
Held et al.

(10) Patent No.: US 11,364,588 B2
(45) Date of Patent: Jun. 21, 2022

(54) METHOD FOR CLEANING USING SOLID CARBON DIOXIDE

(71) Applicant: Bayerische Motoren Werke Aktiengesellschaft, Munich (DE)

(72) Inventors: Bernd Held, Munich (DE); Lukas Langgaertner, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 15/947,300

(22) Filed: Apr. 6, 2018

(65) Prior Publication Data

US 2018/0222012 A1    Aug. 9, 2018

Related U.S. Application Data

(63) Continuation of application No. PCT/EP2016/069555, filed on Aug. 18, 2016.

(30) Foreign Application Priority Data

Oct. 7, 2015   (DE) .................. 10 2015 219 429.9

(51) Int. Cl.
  *B24C 1/00*   (2006.01)
  *B24C 3/12*   (2006.01)
  (Continued)

(52) U.S. Cl.
  CPC ............... *B24C 1/003* (2013.01); *B08B 5/02* (2013.01); *B24C 3/12* (2013.01); *B24C 3/32* (2013.01);
  (Continued)

(58) Field of Classification Search
  CPC combination set(s) only.
  See application file for complete search history.

(56) References Cited

U.S. PATENT DOCUMENTS 6,167,609 B1 *  1/2001  Marinelli .................. C09J 5/02
                                                          29/469.5
6,471,819 B1 * 10/2002  Bar ..................... B29C 63/0052
                                                          118/620

(Continued)

FOREIGN PATENT DOCUMENTS

CN       101068897 A     11/2007
CN       104271254 A      1/2015
(Continued)

OTHER PUBLICATIONS

German Search Report issued in counterpart German Application No. 10 2015 219 429.9 dated Jun. 10, 2016 with partial English-language translation (Fifteen (15) pages).
(Continued)

*Primary Examiner* — Erin F Bergner
(74) *Attorney, Agent, or Firm* — Crowell & Moring LLP

(57) ABSTRACT

A method for cleaning using solid carbon dioxide is provided. Adhesive surfaces of the vehicle components are cleaned automatically in an assembly line including several work stations. The adhesive surfaces of the vehicle components may be adhesive surfaces of coated or painted vehicle components. The vehicle components may be composed of a metal alloy such as a steel or aluminum alloy, and/or composed of a fiber composite material such as carbon-fiber-reinforced plastic. The adhesive surfaces of the vehicle components may be cleaned with specifically adapted cleaning parameters.

19 Claims, 2 Drawing Sheets

(51) Int. Cl.
*B24C 3/32* (2006.01)
*B08B 5/02* (2006.01)

(52) U.S. Cl.
CPC ..... *B08B 2240/00* (2013.01); *B32B 2262/106* (2013.01)

(56) References Cited

U.S. PATENT DOCUMENTS

| | | |
|---|---|---|
| 7,134,946 B1 | 11/2006 | Jackson |
| 8,398,780 B2 | 3/2013 | Krauss et al. |
| 2007/0207310 A1* | 9/2007 | Storey ..................... C09D 5/44 428/336 |
| 2008/0001416 A1* | 1/2008 | Chaudhari .............. B60R 19/18 293/120 |
| 2010/0288310 A1 | 11/2010 | Krauss et al. |
| 2011/0111236 A1 | 5/2011 | Pahl et al. |
| 2014/0102628 A1 | 4/2014 | Ezzat et al. |
| 2014/0245953 A1 | 9/2014 | Albrecht et al. |
| 2015/0158145 A1 | 6/2015 | Herre et al. |

FOREIGN PATENT DOCUMENTS

| | | |
|---|---|---|
| DE | 1130 319 B | 5/1962 |
| DE | 198 28 987 A1 | 1/2000 |
| DE | 199 26 119 A1 | 12/2000 |
| DE | 199 43 005 A1 | 5/2001 |
| DE | 199 26 119 C2 | 6/2001 |
| DE | 101 62 301 A1 | 7/2003 |
| DE | 10 2004 033 728 A1 | 2/2006 |
| DE | 10 2005 002 365 B3 | 4/2006 |
| DE | 20 2007 008 402 U1 | 11/2007 |
| DE | 10 2007 027 618 A1 | 12/2008 |
| DE | 10 2011 103 117 A1 | 12/2012 |
| DE | 10 2012 006 567 A1 | 10/2013 |
| DE | 10 2012 102 984 A1 | 10/2013 |
| DE | 10 2013 220 014 A1 | 4/2014 |
| EP | 0 590 495 A2 | 4/1994 |
| FR | 2 979 263 A1 | 3/2013 |
| GB | 1397102 * | 6/1975 ............ B23C 1/003 |
| WO | WO 00/00326 A1 | 1/2000 |

OTHER PUBLICATIONS

International Search Report (PCT/ISA/210) issued in PCT Application No. PCT/EP2016/069555 dated Oct. 28, 2016 with English-language translation (seven (7) pages).
German-language Written Opinion (PCT/ISA/237) issued in PCT Application No. PCT/EP2016/069555 dated Oct. 28, 2016 (Five (5) pages).
German Search Report issued in counterpart German Application No. 10 2015 219 430.2 dated Jul. 14, 2016 with partial English-language translation (Fifteen (15) pages).
International Search Report (PCT/ISA/210) issued in PCT Application No. PCT/EP2016/069556 dated Oct. 28, 2016 with English-language translation (Seven (7) pages).
German-language Written Opinion (PCT/ISA/237) issued in PCT Application No. PCT/EP2016/069556 dated Oct. 28, 2016 (Five (5) pages).
Chinese-language Office Action issued in counterpart Chinese Application No. 201680036127.6 dated Nov. 1, 2018 with English translation (14 pages).
English translation of Chinese Office Action issued in counterpart Chinese Application No. 201680036127.6 dated May 24, 2019 (five (5) pages).
Chinese-language Office Action issued in counterpart Chinese Application No. 201680036127.6 dated Oct. 23, 2019 with English translation (12 pages).
Chinese-language Board Opinion issued in Chinese Application No. 201680036127.6 dated Jul. 30, 2021 with English translation (13 pages).

* cited by examiner

METHOD FOR CLEANING USING SOLID CARBON DIOXIDE

CROSS REFERENCE TO RELATED APPLICATIONS

This application is a continuation of PCT International Application No. PCT/EP2016/069555, filed Aug. 18, 2016, which claims priority under 35 U.S.C. § 119 from German Patent Application No. 10 2015 219 429.9, filed Oct. 7, 2015, the entire disclosures of which are herein expressly incorporated by reference.

This application contains subject matter related to U.S. application Ser. No. 15/947,338, entitled "Device for Cleaning Adhesive Surfaces Using Solid Carbon Dioxide" filed on even date herewith.

BACKGROUND AND SUMMARY OF THE INVENTION

The invention relates to a method for cleaning using solid carbon dioxide.

DE 199 26 119 A1 has disclosed a blasting tool for generating a jet of $CO_2$ snow, having a first nozzle for generating a $CO_2$ snow jet and having a second nozzle for generating a supporting or pressure jet, wherein the second nozzle surrounds the first nozzle, and the second nozzle is a nozzle for generating a supersonic jet. DE 199 26 119 A1 has furthermore disclosed a device for the treatment, for example cleaning, of the surface of an object, for example of a workpiece or of a sample table, by blasting of the surface with $CO_2$ snow using a blasting tool of said type.

DE 10 2004 033 728 A1 has disclosed a method for processing an adhesive surface of a workpiece, wherein at least the adhesive surface is composed of a metal or of a metal alloy with a hydrated oxide and/or hydroxide layer. In the disclosed method, the adhesive surface is cleaned; the adhesive surface is activated; the adhesive surface is at least partially coated with an adhesion promoter; and the adhesion promoter is chemically converted by way of an after-treatment.

DE 10 2005 002 365 B3 has disclosed a blasting method for the cleaning of surfaces, in which method, in a blasting line, carbon dioxide is added to a flowing carrier gas and is converted by expansion into dry snow. The carbon dioxide is expanded into the carrier gas in a mixing region in which the static pressure is less than 70% of the total pressure. Furthermore, DE 10 2005 002 365 B3 has disclosed a device for generating dry ice, including a feed line for carbon dioxide, a feed line for a carrier gas, a blasting line for a dry snow-gas mixture, and a mixing region in which the carbon dioxide is expanded into the carrier gas, in which device a static pressure which is less than 70% of the total pressure is generated in the mixing region.

The invention is based on the object of improving a method mentioned in the introduction.

This and other objects are achieved by way of a method for cleaning using solid carbon dioxide, wherein, in an assembly line with several work stations, adhesive surfaces of vehicle components are cleaned in an automated fashion.

The method may be a blasting method. The method may be a compressed-air blasting method. The solid carbon dioxide may be used in particle form, in granulate form or in crystal form. The carbon dioxide may be supplied in solid form. The method may be a dry-ice blasting method. The carbon dioxide may initially be supplied in liquid form and subsequently solidified. The method may be a $CO_2$-snow blasting method. The solid carbon dioxide ($CO_2$) may also be referred to as dry ice.

Solid carbon dioxide particles can be accelerated by way of compressed air as it flows through a blasting nozzle. Solid carbon dioxide particles can strike an adhesive surface for cleaning at a very high speed. A layer to be removed can be locally super-cooled and embrittled. Subsequent carbon dioxide particles can ingress into brittle cracks and abruptly sublimate upon impact. The carbon dioxide can become gaseous and, in the process, greatly increase in volume. In the process, it can remove dirt from the adhesive surface.

Adhesive surfaces of coated and/or painted vehicle components can be cleaned. Adhesive surfaces of vehicle components composed of a metal alloy, such as steel or aluminum alloy, and/or composed of a fiber composite material, such as carbon-fiber-reinforced plastic (CRP) can be cleaned.

Adhesive surfaces of vehicle components can be cleaned with specifically adapted cleaning parameters. For the cleaning of adhesive surfaces of vehicle components, cleaning parameters can be adapted with regard to an achievable adhesion force, a processing time and/or economy.

For the specific adaptation of cleaning parameters for adhesive surfaces of vehicle components, it can firstly be the case that, alternately, in each case one cleaning parameter is varied while the other cleaning parameters remain unchanged, in order to respectively determine an optimum parameter value, and subsequently a combination of cleaning parameters can be selected.

For the cleaning of adhesive surfaces of vehicle components, at least one of the following cleaning parameters can be specifically adapted: a spacing of a blasting nozzle from an adhesive surface for cleaning; a movement speed of a blasting nozzle relative to an adhesive surface for cleaning; a mass flow of solid carbon dioxide; a pressure for accelerating solid carbon dioxide; and an angle between a blasting nozzle and an adhesive surface for cleaning.

For a holding-force-optimized cleaning of adhesive surfaces of vehicle components composed of a painted metal alloy, such as steel or aluminum alloy, a spacing of a blasting nozzle from an adhesive surface for cleaning can be freely selected, a blasting nozzle can be moved relative to an adhesive surface for cleaning with a speed of approximately 45 mm/s to approximately 55 mm/s, in particular of approximately 50 mm/s, a mass flow of solid carbon dioxide of approximately 30 kg/h to approximately 40 kg/h, in particular of approximately 35 kg/h can be set, a pressure for accelerating solid carbon dioxide of approximately 5 bar to approximately 7 bar, in particular of approximately 6 bar, can be set, and an angle between a blasting nozzle and an adhesive surface for cleaning of approximately 62.5° to approximately 72.5°, in particular of approximately 67.5°, can be set.

For a holding-force-optimized cleaning of adhesive surfaces of vehicle components composed of a fiber composite material, such as carbon-fiber-reinforced plastic, a spacing of a blasting nozzle from an adhesive surface for cleaning can be set to approximately 60 mm to approximately 70 mm, in particular to approximately 65 mm, a blasting nozzle can be moved relative to an adhesive surface for cleaning with a speed of approximately 20 mm/s to approximately 30 mm/s, in particular of approximately 25 mm/s, a mass flow of solid carbon dioxide of approximately 15 kg/h to approximately 25 kg/h, in particular of approximately 20 kg/h can be set, a pressure for accelerating solid carbon dioxide of approximately 3.5 bar to approximately 5.5 bar, in particular of approximately 4.5 bar, can be set, and an angle between a blasting nozzle and an adhesive surface for cleaning of approximately 10° to approximately 20°, in particular of approximately 15°, can be set.

For a process-time-optimized and/or economically optimized cleaning of adhesive surfaces of vehicle components composed of a painted metal alloy, such as steel or aluminum alloy, a spacing of a blasting nozzle from an adhesive surface for cleaning can be freely selected, a blasting nozzle can be moved relative to an adhesive surface for cleaning with a speed of approximately 70 mm/s to approximately 80 mm/s, in particular of approximately 75 mm/s, a mass flow of solid carbon dioxide of approximately 10 kg/h to approximately 20 kg/h, in particular of approximately 15 kg/h can be set, a pressure for accelerating solid carbon dioxide of approximately 5 bar to approximately 7 bar, in particular of approximately 6 bar, can be set, and an angle between a blasting nozzle and an adhesive surface for cleaning of approximately 55° to approximately 65°, in particular of approximately 60°, can be set.

For a process-time-optimized and/or economically optimized cleaning of adhesive surfaces of vehicle components composed of a fiber composite material, such as carbon-fiber-reinforced plastic, a spacing of a blasting nozzle from an adhesive surface for cleaning can be set to approximately 60 mm to approximately 70 mm, in particular to approximately 65 mm, a blasting nozzle can be moved relative to an adhesive surface for cleaning with a speed of approximately 30 mm/s to approximately 40 mm/s, in particular of approximately 35 mm/s, a mass flow of solid carbon dioxide of approximately 10 kg/h to approximately 20 kg/h, in particular of approximately 15 kg/h can be set, a pressure for accelerating solid carbon dioxide of approximately 3.5 bar to approximately 5.5 bar, in particular of approximately 4.5 bar, can be set, and an angle between a blasting nozzle and an adhesive surface for cleaning of approximately 80° to approximately 90°, in particular of approximately 85°, can be set.

After blasting with solid carbon dioxide, vehicle components can be freed from an electrostatic charge.

The method can be performed by way of an apparatus for cleaning adhesive surfaces of vehicle components using solid carbon dioxide. The apparatus, for the automated cleaning in an assembly line with multiple working stations, has a chamber-like cleaning room for vehicle components, a blasting device with a blasting nozzle for blasting vehicle components with solid carbon dioxide, a transport device for transporting vehicle components through the cleaning room, and a charge dissipation device for eliminating an electrostatic charge of vehicle components.

The apparatus may be part of an assembly line with multiple working stations. The apparatus may be arranged in the assembly line upstream of a working station in which an adhesive process is performed.

The vehicle components may be motor vehicle components. The vehicle components may be assemblies. The vehicle components may be body parts. The vehicle components may be vehicle roofs. The vehicle components may be produced at least partially from a metal alloy, such as steel or aluminum alloy. The vehicle components may be at least partially coated and/or painted. The vehicle components may be produced at least partially from a fiber composite material, such as carbon-fiber-reinforced plastic.

The adhesive surfaces may serve for the cohesive connection of the vehicle components to other vehicle components by way of an adhesive. The solid carbon dioxide ($CO_2$) may also be referred to as dry ice.

The cleaning room may have side walls. The cleaning room may have a ceiling. The cleaning room may have a closable entrance and/or a closable exit. The entrance may serve for the supply of vehicle components into the cleaning room. The entrance may serve for the discharge of vehicle components from the cleaning room.

The blasting device may be a dry-ice blasting device. The blasting device may be a $CO_2$-snow blasting device.

The blasting device may have a compressed-air generator. The blasting device may have a refillable and/or exchangeable accumulator for solid carbon dioxide. The blasting device may have a connecting hose for the connection of the compressed-air generator to the blasting nozzle. The blasting device may have a connecting hose for the connection of the carbon dioxide accumulator to the blasting nozzle.

The cleaning room may, at least in sections, have a passive noise protection device. The noise protection device may have a mechanism for sound deadening and/or sound damping. The noise protection device may be arranged on the side walls and/or on the ceiling. The entrance and/or the exit of the cleaning room may be closable by way of a roller door. A roller door may be a high-speed door.

The apparatus may have an industrial robot for the automated guidance of the blasting nozzle. The industrial robot may have a manipulator, an effector and a control device. The industrial robot may be programmable for the cleaning of adhesive surfaces of vehicle components. The effector may have the blasting nozzle.

The industrial robot may be capable of collaboration. The industrial robot may be suitable for collaboration with a technician. The apparatus may have a portal-like carrier device. It may be possible for vehicle components for cleaning to be led through the carrier device. The industrial robot may be arranged on the carrier device. The industrial robot may be arranged in a suspended fashion on the carrier device.

The transport device may have assembly carriers. The charge dissipation device may have an ionizer. The ionizer may be arranged downstream of the blasting device in a transport direction. The ionizer may be arranged in the region of the exit of the cleaning room. The ionizer may serve for the partial ionization of air. The charge dissipation device may have a blower for blowing ionized air onto vehicle components.

In summary, the invention thus yields, inter alia, a parametric optimization of quality of a blasting process using dry ice for cleaning surfaces. Adhesive surfaces, such as for example of a roof cutout of a motor vehicle panoramic roof, can firstly be cleaned by dry-ice blasting. Here, a cleaning process can be optimized through variation of various parameters. Said parameters may differ depending on material characteristics.

A few exemplary parameters are listed below. Spacing may denote a spacing of a nozzle from a surface for cleaning. The spacing may be measured in mm. Speed may denote a speed with which the nozzle moves over the surface for cleaning. Said speed may be measured in mm/s. Mass flow may denote a quantity of dry ice used for cleaning purposes during a certain time interval. This may be measured in kg/h. Pressure may denote a pressure with which the dry ice is accelerated onto the surface. This may be measured in bar. Angle may denote an angle between nozzle and surface in degrees.

In this method, in each case one parameter may be varied and subsequently selected such that, in a subsequent adhesive process, an adhesion force is maximized. Below, the various parameters may be selected so as to yield a maximum adhesion force in each case. Here, said values may be material-dependent. For example, entirely different values and tendencies may arise for sheet metal than for carbon-fiber-reinforced plastic (CRP).

Automation is facilitated or made possible by way of an embodiment of the invention. A burden on a technician, in particular an ergonomic burden and/or a health burden owing to solvents and/or cleaning agents, is reduced or eliminated. An expenditure for the cleaning process, in particular an expenditure for solvent and/or cleaning agent, and/or an expenditure of time, is reduced. Manual effort is reduced or eliminated. A generation of noise is reduced. Use of the device together with technicians is made possible. An electrostatic charge is reduced or eliminated. A measurement system for adhesive surfaces for cleaning can be omitted. Fully automated cleaning using dry ice in closed rooms in the body construction and/or vehicle assembly sector is made possible. A cleaning action is improved. A removal of dirt, in particular cavity sealing residues, conveyor machinery oil, greases introduced by technicians, or dust, is improved. A cleaning action is improved by way of a combination of mechanical cleaning and thermal cleaning.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
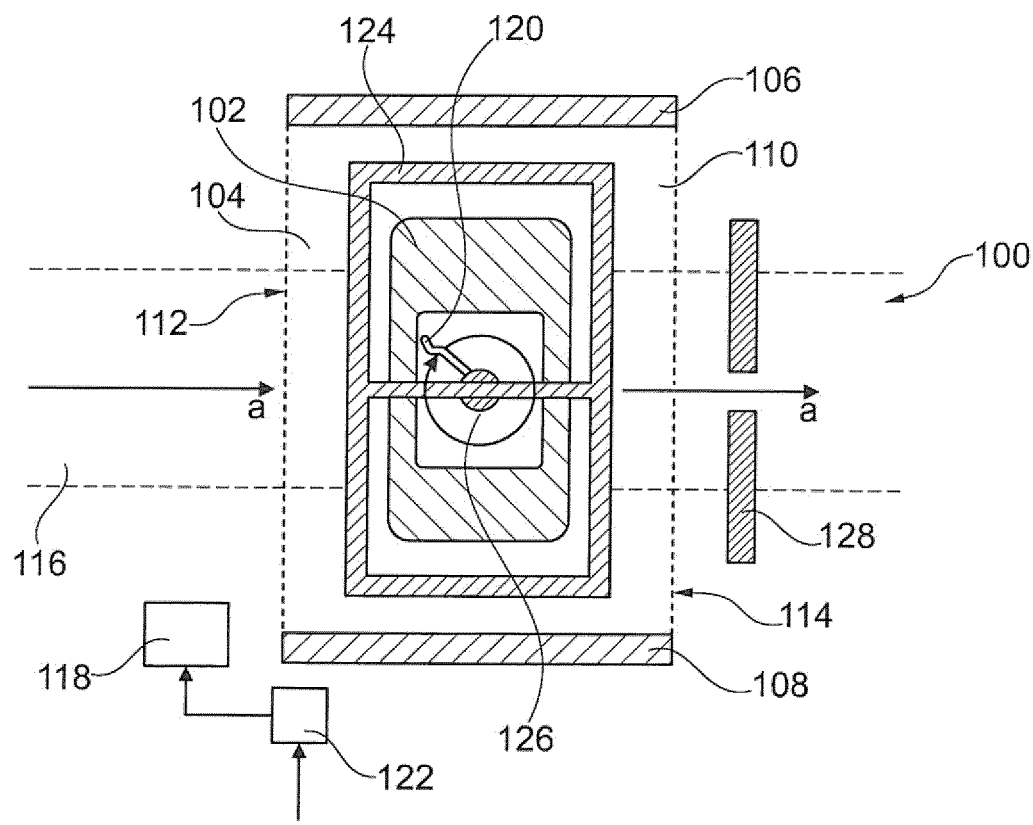
FIG. 1 is a view of an apparatus for the cleaning of adhesive surfaces of vehicle components using solid carbon dioxide, in a plan view.
Figure 2:
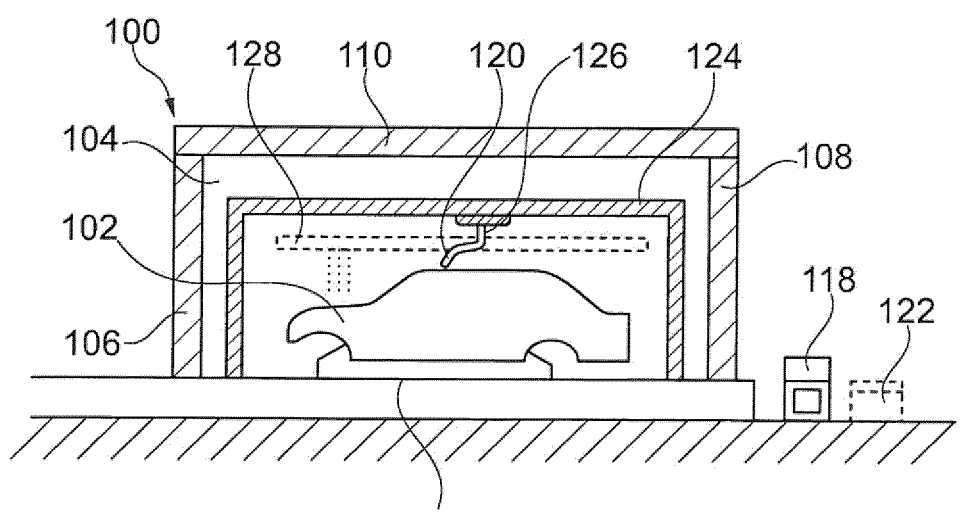
FIG. 2 is a view of an apparatus for the cleaning of adhesive surfaces of vehicle components using solid carbon dioxide, in a view from the entrance side.

FIG. 1 shows an apparatus 100 for the cleaning of adhesive surfaces of vehicle components 102 using solid carbon dioxide, in a plan view. FIG. 2 shows the apparatus 100 in a view from the entrance side.

The apparatus 100 is part of an assembly line (not illustrated in detail here) with multiple working stations. The apparatus 100 is arranged in the assembly line upstream of a working station in which an adhesive process is performed.

In the present case, the vehicle components 102 are vehicle bodies, which are produced from a metal alloy, such as steel or aluminum alloy, or from a fiber composite material, such as carbon-fiber-reinforced plastic, and which are at least partially coated and/or painted. The vehicle bodies have in each case a roof cutout, at the edge of which there are arranged adhesive surfaces for the purposes of adhesively bonding a panoramic roof into the roof cutout.

The apparatus 100 has a chamber-like cleaning room 104 with side walls 106, 108, a ceiling 110, an entrance 112 and an exit 114. The entrance 112 and the exit 114 can each be closed off by way of a high-speed roller door. The cleaning room 104 has a passive noise protection device with mechanisms for sound deadening and/or sound damping, which mechanisms are arranged on the side walls 106, 108 and on the ceiling 110.

The apparatus 100 has a transport device 116 with a conveyor device and with assembly carriers for transporting vehicle components 102 through the cleaning room 104. The transport device 116 serves for transporting the vehicle components 102 through the entrance 112 into the cleaning room 104, through the cleaning room 104, and through the exit 114 out of the cleaning room 104.

The apparatus 100 has a blasting device 118 with a blasting nozzle 120 for blasting the vehicle components 102 with solid carbon dioxide. The blasting device 118 is in the present case a dry-ice blasting device. Dry-ice blasting is a compressed-air blasting method in which solid carbon dioxide, also referred to as dry ice, e.g., at a temperature of −78.9° C. is used as blasting medium. For the cleaning, solid carbon dioxide particles are accelerated by way of compressed air as it flows through the blasting nozzle 120, and strike an adhesive surface for cleaning at a very high speed. The layer to be removed is thereby locally super-cooled and embrittled. Subsequent carbon dioxide particles ingress into brittle cracks and abruptly sublimate upon impact. The carbon dioxide becomes gaseous and, in the process, greatly increases in volume. In the process, it removes dirt from the adhesive surface. The blasting device 118 is arranged on the transport device 116.

The blasting device 118 has a refillable and/or exchangeable accumulator 122 for solid carbon dioxide. The accumulator 122 is exchangeable for the provision of new solid carbon dioxide. The blasting device 118 has connecting hoses for the supply of compressed air and solid carbon dioxide to the blasting nozzle 120.

The apparatus 100 has a portal-like carrier device 124 through which vehicle components 102 can be transported by way of the transport device 116 for cleaning purposes. The carrier device 124 is, in the present case, formed in the manner of a frame from aluminum profiles with a transverse strut.

The apparatus 100 has an industrial robot 126 for the automated guidance of the blasting nozzle 120. The industrial robot 126 has a manipulator and a control device, and is programmable for the cleaning of adhesive surfaces of the vehicle components 102. The blasting nozzle 120 is arranged on the manipulator and serves as an effector of the industrial robot 126. The industrial robot 126 is arranged in a suspended manner on the carrier device 124. The industrial robot 126 is suitable for collaboration with a technician.

The apparatus 100 has a charge dissipation device 128 with an ionizer for eliminating an electrostatic charge of the vehicle components 102. The charge dissipation device 128 is, in the transport direction a, arranged downstream of the industrial robot 126 with the blasting nozzle 120, and serves for eliminating an electrostatic charge of the vehicle components 102 that has arisen as a result of the dry-ice blasting process. The ionizer is a regulated ionizer, in the case of which an electrical field is regulated through measurement and targeted readjustment of a high voltage. The charge dissipation device 128 has a blower for blowing ionized air onto the vehicle components 102.

Adhesive surfaces of vehicle components 102 are cleaned in each case with specifically adapted cleaning parameters. The cleaning parameters are adapted in each case with regard to an achievable adhesion force, a process time and/or economy. For the specific adaptation of the cleaning parameters, it is firstly case that, alternately, in each case one cleaning parameter is varied while the other cleaning parameters remain unchanged, in order to respectively determine an optimum parameter value. Subsequently, a combination of cleaning parameters is selected.

Figure 3:
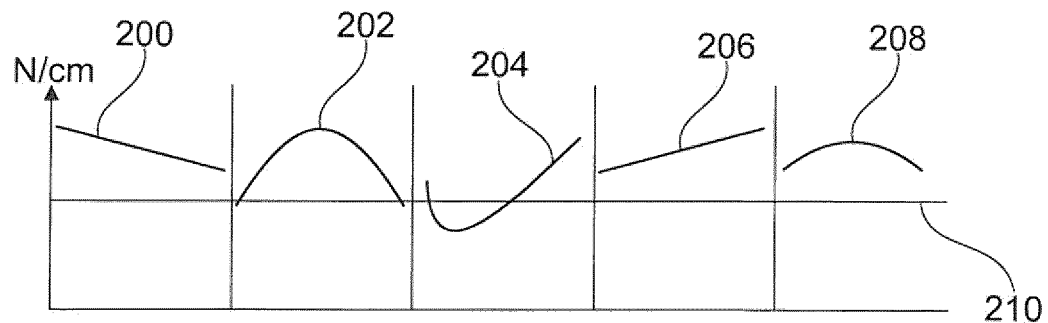
FIG. 3 is an illustration of a specific adaptation of cleaning parameters for adhesive surfaces of vehicle components composed of a metal alloy, such as steel or aluminum alloy.

FIG. 3 shows a specific adaptation of cleaning parameters for adhesive surfaces of vehicle components composed of a metal alloy, such as steel or aluminum alloy, with regard to a holding force.

In FIG. 3, a respectively achieved holding force is plotted in N/cm. For the determination of a holding force, in the case of varying cleaning parameters, a material strip is adhesively bonded in each case to a cleaned adhesive surface, and is pulled off in a peel test, with the holding force being measured.

Firstly, a spacing 200 of a blasting nozzle from an adhesive surface for cleaning is varied while the other cleaning parameters remain unchanged. Subsequently, a movement speed 202 of a blasting nozzle relative to an adhesive surface for cleaning is varied while the other cleaning parameters remain unchanged. Subsequently, a mass flow 204 of solid carbon dioxide is varied while the other cleaning parameters remain unchanged. Subsequently, a pressure 206 for accelerating solid carbon dioxide is varied while the other cleaning parameters remain unchanged. Subsequently, an angle 208 between a blasting nozzle and an adhesive surface for cleaning is varied while the other cleaning parameters remain unchanged. The individual parameters may also be varied in a different sequence.

A reference line 210 shows a holding force achieved in the case of cleaning of an adhesive surface using isopropanol. It can be seen that, in the case of cleaning using solid carbon dioxide, it is generally the case that higher holding forces can be achieved than in the case of cleaning of an adhesive surface using isopropanol.

Figure 4:
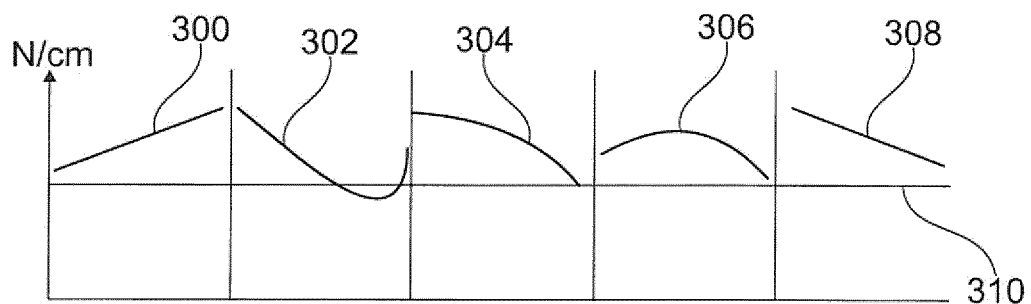
FIG. 4 is an illustration of a specific adaptation of cleaning parameters for adhesive surfaces of vehicle components composed of a fiber composite material, such as carbon-fiber-reinforced plastic.

FIG. 4 shows a specific adaptation of cleaning parameters for adhesive surfaces of vehicle components composed of a fiber composite material, such as carbon-fiber-reinforced plastic, with respect to a holding force.

In FIG. 4, a respectively achieved holding force is plotted in N/cm. For the determination of a holding force, in the case of varying cleaning parameters, a material strip is adhesively bonded in each case to a cleaned adhesive surface, and is pulled off in a peel test, with the holding force being measured.

Firstly, a spacing 300 of a blasting nozzle from an adhesive surface for cleaning is varied while the other cleaning parameters remain unchanged. Subsequently, a movement speed 302 of a blasting nozzle relative to an adhesive surface for cleaning is varied while the other cleaning parameters remain unchanged. Subsequently, a mass flow 304 of solid carbon dioxide is varied while the other cleaning parameters remain unchanged. Subsequently, a pressure 306 for accelerating solid carbon dioxide is varied while the other cleaning parameters remain unchanged. Subsequently, an angle 308 between a blasting nozzle and an adhesive surface for cleaning is varied while the other cleaning parameters remain unchanged. The individual parameters may also be varied in a different sequence.

A reference line 310 shows a holding force achieved in the case of cleaning of an adhesive surface using isopropanol. It can be seen that, in the case of cleaning using solid carbon dioxide, it is generally the case that higher holding forces can be achieved than in the case of cleaning of an adhesive surface using isopropanol.

Reference Designations

100 Apparatus
102 Vehicle component
104 Cleaning room
106 Side wall
108 Side wall
110 Ceiling
112 Entrance
114 Exit
116 Transport device
118 Blasting device
120 Blasting nozzle
122 Accumulator
124 Carrier device
126 Industrial robot
128 Charge dissipation device
200 Spacing
202 Movement speed
204 Mass flow
206 Pressure
208 Angle
210 Reference line
300 Spacing
302 Movement speed
304 Mass flow
306 Pressure
308 Angle
310 Reference line The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for cleaning in a vehicle assembly line, the method comprising the acts of:
   providing the vehicle assembly line with several work stations, wherein the vehicle assembly line includes a transport device;
   transporting a vehicle body, using the transport device, from a painting or coating station through a chamber-type cleaning room to an adventure applying station;
   painting or coating the vehicle body, using the painting or coating station; and
   blasting the vehicle body with a solid carbon dioxide using a blasting device and a charge dissipation device;
   cleaning adhesive surfaces of the vehicle body with the blasting device having a blasting nozzle configured to blast the vehicle body with a solid carbon dioxide; eliminating an electrostatic charge of the vehicle body with the charge dissipation device; and applying adhesive to the cleaned adhesive surfaces in the adhesive applying station.

2. The method according to claim 1, wherein the act of cleaning the adhesive surfaces comprises cleaning the adhesive surfaces of vehicle components composed of a metal alloy and/or composed of a fiber composite material.

3. The method according to claim 1, wherein the act of cleaning the adhesive surfaces comprises cleaning the adhesive surfaces of vehicle components composed of a metal alloy and/or composed of a fiber composite material, and the metal alloy is a steel or aluminum alloy, and/or the fiber composite material is a carbon-fiber-reinforced plastic.

4. The method according to claim 1, wherein the adhesive surfaces of the vehicle body are cleaned with specifically adapted cleaning parameters.

5. The method according to claim 3, wherein the adhesive surfaces of the vehicle body are cleaned with specifically adapted cleaning parameters.

6. The method according to claim 4, wherein for the cleaning of the adhesive surfaces of the vehicle body, the cleaning parameters are adapted with regard to an achievable holding force, a processing time and/or economy.

7. The method according to claim 5, wherein for the cleaning of the adhesive surfaces of the vehicle body, the cleaning parameters are adapted with regard to an achievable holding force, a processing time and/or economy.

8. The method according to claim 4, wherein
for specific adaptation of the cleaning parameters for the adhesive surfaces of the vehicle body, one of the cleaning parameters is varied while the others of the cleaning parameters remain unchanged, in order to respectively determine an optimum parameter value, and subsequently a combination of cleaning parameters is selected.

9. The method according to claim 7, wherein
for specific adaptation of the cleaning parameters for the adhesive surfaces of the vehicle body, one of the cleaning parameters is varied while the others of the cleaning parameters remain unchanged, in order to respectively determine an optimum parameter value, and subsequently a combination of cleaning parameters is selected.

10. The method according to claim 4, wherein for the cleaning of the adhesive surfaces of the vehicle components, at least one of the following cleaning parameters is specifically adapted: a spacing of a blasting nozzle from the adhesive surfaces for cleaning; a movement speed of a blasting nozzle relative to the adhesive surfaces for cleaning; a mass flow of solid carbon dioxide; a pressure for accelerating solid carbon dioxide; and/or an angle between a blasting nozzle and the adhesive surfaces for cleaning.

11. The method according to claim 9, wherein for the cleaning of the adhesive surfaces of the vehicle components, at least one of the following cleaning parameters is specifically adapted: a spacing of a blasting nozzle from the adhesive surfaces for cleaning; a movement speed of a blasting nozzle relative to the adhesive surfaces for cleaning; a mass flow of solid carbon dioxide; a pressure for accelerating solid carbon dioxide; and/or an angle between a blasting nozzle and the adhesive surfaces for cleaning.

12. The method according to claim 4, wherein for a holding-force-optimized cleaning of the adhesive surfaces of the vehicle components composed of a painted metal alloy, a spacing of a blasting nozzle from the adhesives surface for cleaning is freely selected; a blasting nozzle is moved relative to the adhesive surfaces for cleaning with a speed of approximately 45 mm/s to approximately 55 mm/s; a mass flow of solid carbon dioxide of approximately 30 kg/h to approximately 40 kg/his set; a pressure for accelerating solid carbon dioxide of approximately 5 bar to approximately 7 bar is set; and an angle between a blasting nozzle and the adhesive surfaces for cleaning of approximately 62.50 to approximately 72.50 is set.

13. The method according to claim 12, wherein
the painted metal alloy is a steel or aluminum alloy,
the speed for moving the blasting nozzle relative to the adhesive surface for cleaning is approximately 50 mm/s,
the mass flow of the solid carbon dioxide is set at approximately 35 kg/h,
the pressure for accelerating the solid carbon dioxide is set at approximately 6 bar, and/or
the angle between the blasting nozzle and the adhesive surface for cleaning is set at approximately 67.5°.

14. The method according to claim 4, wherein for a holding-force-optimized cleaning of the adhesive surfaces of the vehicle components composed of a fiber composite material, a spacing of a blasting nozzle from the adhesive surfaces for cleaning is set to approximately 60 mm to approximately 70 mm; a blasting nozzle is moved relative to the adhesive surfaces for cleaning with a speed of approximately 20 mm/s to approximately 30 mm/s; a mass flow of solid carbon dioxide of approximately 15 kg/h to approximately 25 kg/his set; a pressure for accelerating solid carbon dioxide of approximately 3.5 bar to approximately 5.5 bar is set; and an angle between a blasting nozzle and the adhesive surfaces for cleaning of approximately 100 to approximately 200 is set.

15. The method according to claim 14, wherein
the spacing of the blasting nozzle from the adhesive surface for cleaning is set to approximately 65 mm,
the speed for moving the blasting nozzle relative to the adhesive surface for cleaning is approximately 25 mm/s,
the mass flow of the solid carbon dioxide is set at approximately 20 kg/h,
the pressure for accelerating the solid carbon dioxide is set at approximately 4.5 bar, and/or
the angle between the blasting nozzle and the adhesive surface for cleaning is set at approximately 15°.

16. The method according to claim 4, wherein for a process-time-optimized and/or economically optimized cleaning of the adhesive surfaces of the vehicle components composed of a painted metal alloy, a spacing of a blasting nozzle from the adhesive surfaces for cleaning is freely selected; a blasting nozzle is moved relative to the adhesive surfaces for cleaning with a speed of approximately 70 m/s to approximately 80 mm/s; a mass flow of solid carbon dioxide of approximately 10 kg/h to approximately 20 kg/h is set; a pressure for accelerating solid carbon dioxide of approximately 5 bar to approximately 7 bar is set; and an angle between a blasting nozzle and the adhesive surfaces for cleaning of approximately 550 to approximately 650 is set.

17. The method according to claim 16, wherein
the speed for moving the blasting nozzle relative to the adhesive surface for cleaning is approximately 75 mm/s,
the mass flow of the solid carbon dioxide is set at approximately 15 kg/h,
the pressure for accelerating the solid carbon dioxide is set at approximately 6 bar, and/or
the angle between the blasting nozzle and the adhesive surface for cleaning is set at approximately 60°.

18. The method according to claim 4, wherein for a process-time-optimized and/or economically optimized cleaning of the adhesive surfaces of the vehicle components composed of a fiber composite material, a spacing of a blasting nozzle from the adhesive surfaces for cleaning is set to approximately 60 mm to approximately 70 mm; a blasting nozzle is moved relative to the adhesive surfaces for cleaning with a speed of approximately 30 mm/s to approximately 40 mm/s; a mass flow of solid carbon dioxide of approximately 10 kg/h to approximately 20 kg/h is set; a pressure for accelerating solid carbon dioxide of approximately 3.5 bar to approximately 5.5 bar is set; and an angle between a blasting nozzle and the adhesive surfaces for cleaning of approximately 800 to approximately 900 is set.

19. The method according to claim 18, wherein
the spacing of the blasting nozzle from the adhesive surface for cleaning is set to approximately 65 mm,
the speed for moving the blasting nozzle relative to the adhesive surface for cleaning is approximately 35 mm/s, the mass flow of the solid carbon dioxide is set at approximately 15 kg/h,
the pressure for accelerating the solid carbon dioxide is set at approximately 4.5 bar, and/or
the angle between the blasting nozzle and the adhesive surface for cleaning is set at approximately 85°.

* * * * *